Feb. 18, 1941.  F. M. PYZEL  2,232,674
METHOD FOR CARRYING OUT CHEMICAL REACTIONS
Filed May 27, 1939    2 Sheets-Sheet 1
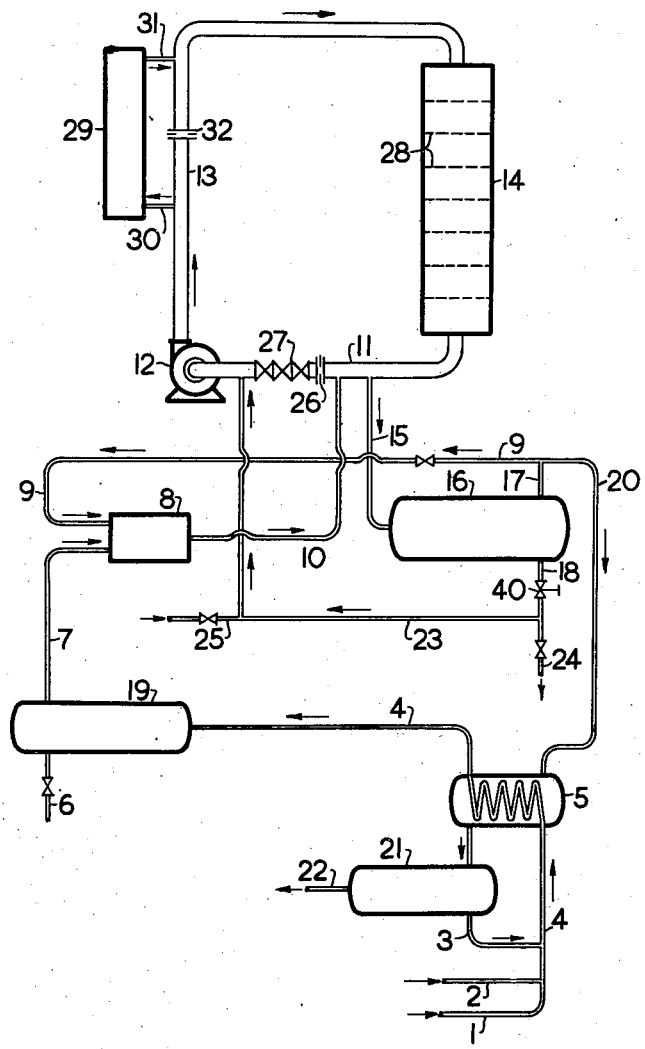
Fig. I
Inventor: Frederic M. Pyzel
By his Attorney: Millard L. Caldwell

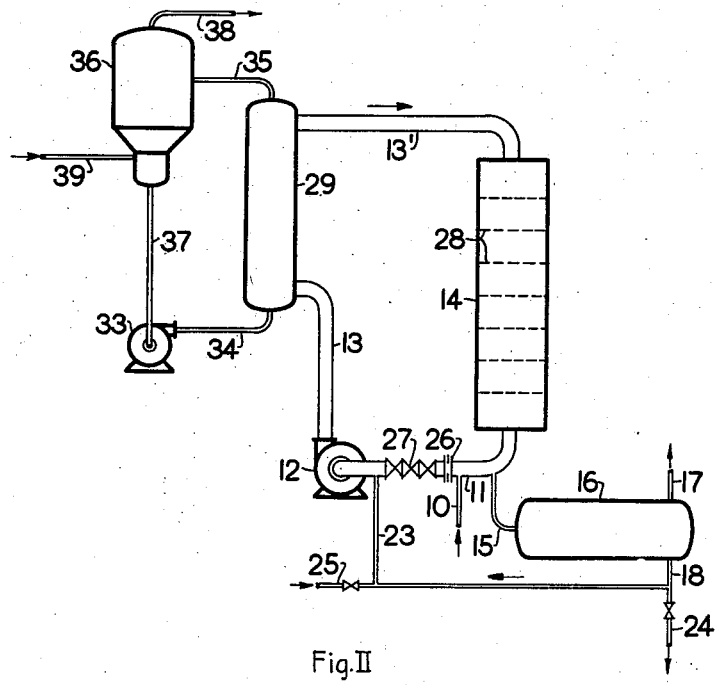
Fig. II
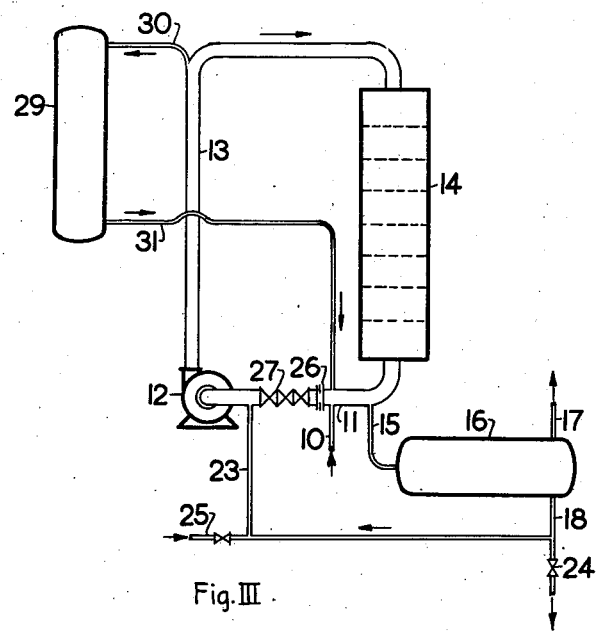
Fig. III
Inventor: Frederic M. Pyzel
By his Attorney: Millard L. Caldwell Patented Feb. 18, 1941

2,232,674

UNITED STATES PATENT OFFICE 2,232,674

METHOD FOR CARRYING OUT CHEMICAL REACTIONS

Frederic M. Pyzel, Piedmont, Calif., assignor to Shell Development Company, San Francisco, Calif., a corporation of Delaware Application May 27, 1939, Serial No. 276,251

4 Claims. (Cl. 23—1)

This invention relates to a process of carrying out chemical reactions between reactants in the fluid state and deals with a novel assemblage of apparatus whereby such reactions may be carried out in a more efficient manner.

An important object of the invention is the provision of a method and apparatus whereby chemical reactions may be conducted in a more selective manner to produce higher yields of desired end products over longer periods of time and to minimize or suppress undesirable side reactions to a greater extent than has been hitherto attained. It is an object of my invention to provide a method whereby the proportions of the reactants may be controlled in a simple manner of great flexibility without resort to unnecessary separation of reaction products. Another object of my invention is the provision of apparatus in which chemical reactions may be carried out continuously with minimum operating and maintenance expense and which involves low initial cost. The reaction apparatus of my invention further provides positive control of the reaction time whereby incomplete or excessive reaction of one or more components of the reaction mixture may be avoided. A further object of the invention is the provision of a reaction system in which thorough mixing of the reactants may be accomplished and uniformity of the reaction mixture may be maintained throughout the reaction period with the minimum expenditure of power. My invention provides maximum desired reaction in minimum time giving high throughput or production capacity for a given apparatus.

My invention is adapted to carry out a wide variety of different chemical reactions particularly between reactive chemicals in the liquid phase. As examples of the diverse reactions to which my invention may be applied may be mentioned the sulfation or hydration of olefines, alkylation, for example, of aromatic compounds such as benzene or of naphthenes, the saponification of fats, etc. My invention is broadly applicable to chemical reactions of both organic and inorganic character and is especially adapted for the performance of reactions involving a plurality of liquid phases. A general type of chemical reaction in which the apparatus and method of my invention have demonstrated particular advantage over prior practice is that involving a plurality of reactants of substantially different orders of reactivities.

In the past this type of reaction has proven especially difficult to control, and it has been impractical to secure high yields of product without great sacrifice of the more reactive material present due to side reactions thereof. Typical of this class of reactions are the interpolymerization of olefines of different reactivities such, for example, as the reaction of tertiary olefines with secondary olefines to form interpolymers in the presence of catalysts such as sulfuric and phosphoric acids, aluminum chloride, boron fluoride and the like, and the etherification of unsaturated halides by alcohols in the presence of a base, as the reaction of allyl chloride with ethyl alcohol and the like in the presence of sodium hydroxide to form ethyl allyl ether in which reaction the tendency of allyl chloride to hydrolyze leads to low yields which greatly increase the cost of the final product. The esterification of unsaturated and/or hydroxy acids, as in the preparation of methyl methacrylate, and alkylation of aromatic hydrocarbons or phenols involving highly reactive alkylation agents, such for example, as olefines, and condensation of ketones of different reactivities to form ketols or unsaturated ketones, particularly the condensation of ketones with more reactive compounds such as aldehydes, are still other examples of reactions which may be carried out with improved yields by my process and apparatus. For the purpose of making my invention more clear its application to reactions of these types, particularly the alkylation of isoparaffins by olefines whether monomeric or polymeric and the interpolymerization of different olefines will be used to illustrate the principles involved. It will be understood, however, that this implies no limitation on the invention as my method and apparatus are applicable to other types of reaction with the same or other materials.

In reacting olefines with isoparaffins in the presence of catalysts such as sulfuric acid or the like, for example, it has been found that the higher reactivity of the olefine leads it to react preferentially with the acid to form sulfonates or mono- or di-alkyl sulfates or to react with other molecules of the same or different olefine present to form polymers or to undergo other undesirable side reactions. These side reactions not only reduce the yield of desired alkylation product but also tend to make the acid ineffective as an alkylation catalyst. Only by providing an excess of the less reactive isoparaffin molecules relative to the olefine molecules may these undesirable side reactions be sufficiently suppressed so that the reaction may be made to go predominantly to alkylation and the catalyst protected. Similarly in prior methods of carrying out the interpolymerization of isomeric olefines such as normal butylene with isobutylene in the presence of polymerization catalysts such as sulfuric acid, the greater reactivity of the isobutylene has resulted in the formation of large amounts of isobutylene copolymers. This tendency to form true polymers instead of the desired interpolymers may be decreased by increasing the ratio of the less reactive normal butylene to the isobutylene present in the reaction mixture. It has been proposed to bring about this high ratio of normal to iso-olefine by using unreacted hydrocarbon separated from the reaction products as part of the feed to the reactor. My invention provides a simpler, more effective and economical means for maintaining such desirable high ratio of the less reactive to more reactive olefine at all times in the reaction whereby undesirable side reactions of the more reactive olefine are eliminated. Since the less reactive molecules will be reacted to a lesser degree than the more reactive molecule involved in the reaction, their ratio in the reacted product will always be higher than their ratio in the feed. My apparatus is designed to take advantage of this fact. It is so constructed that the ratio of reactants in the reactor may be controlled by recycling a predetermined desirable amount of reacted product. This method of operation makes it unnecessary to separate unreacted components from the reacted mixture in order to supply an excess of the less reactive material to the feed and also provides an improved means for maintaining the reaction temperature within any desired narrow limits. The latter advantage is achieved by the recycle stream which so increases the mass of liquid circulating that the effect of the reaction on the total temperature is small and can therefore be controlled in a simple and efficient manner.

The advantage of eliminating unnecessary separation of reactants can be appreciated not only from the fact that smaller and more economical separating means may be used since only so much of the reacted mixture need be separated as is required for actual recovery of the product but also from the consideration of the advantages resulting from the saving involved in remixing. The time required to bring two liquids to the point of complete mixture is very important particularly where highly reactive materials are involved. It is often the case that even though reactants may be present in the proper over-all proportions in a mixture nonuniformities of composition within the mixture may lead to localized undesirable reactions which tend to nullify the effect of the proportions of the reactants. Not only does it take longer to achieve a uniform mixture but also more power is required as the difference in the volume of two reactants increases. My invention eliminates such mixing difficulties by recycling premixed reaction mixture to provide the necessary excess of less reactive material.

Reactions involving a plurality of phases, such, for example, as interpolymerization and isoparaffin alkylation reactions using olefines in the presence of catalysts such as sulfuric acid and the like, involve another mixing problem. In order to promote high reaction rates it is desirable that the catalyst be intimately mixed with the hydrocarbon as well as that the mixture undergoing reaction be of as uniform composition as possible in order that full advantage may be derived from the excess reactant. My apparatus accomplishes this end by providing for thorough mixing of the reactants at the time they are introduced and for the maintenance of uniformity of composition throughout the period of reaction. A particularly advantageous feature of the invention in this regard is the provision of residence time increasing means such as time tanks through which the recycling mixture flows and which are provided with dispersing means, preferably perforated plates so spaced and each providing such a degree of turbulence that the desired uniformity of dispersion is maintained from plate to plate throughout the entire reaction period.

The recycling of reacted mixture to the reaction has been considered undesirable and has been avoided because of the mistaken belief that the difficulties due to low yield would be increased by exposing the reaction product to further reaction and that the dilution of the reaction mixture by such products would materially reduce the capacity of the reactor. I have found, however, that no such undesirable results are obtained when the apparatus of my invention is used. Whereas in prior art practice of continuous reaction between liquid reactants it has been customary to feed the reactants into a mixing zone and continuously withdraw reaction product in equivalent amount, my apparatus and process make it unnecessary to proportion the reactants in the feed in the same ratio as is required for the reaction. Instead, it is possible by my procedure to employ any desired proportion of reactants in the feed and maintain a different desirable proportion in the reactor. In my method of operation the time of reaction is substantially uniform for all material passing through the reactor. This is in marked contrast to prior reaction methods employing mixing tanks agitated by stirrers or the like, in which it is practically impossible to either confine the mixing to a limited region or provide a uniform residence time for all the material treated. In my apparatus, however, the feed inlet and product outlet points are separated by residence time increasing means the flow through which is positive and uniform and consequently the opportunity for short-circuiting is absent. This more uniform reaction time made possible by my apparatus contributes materially to higher yields and improved quality of product through avoidance of incomplete or excessive reaction.

In the drawings Figure I shows, diagrammatically, one assemblage of apparatus which provides a particularly desirable means for practicing my invention. Figures II and III illustrate advantageous modifications which may be used for temperature control in the system.

Referring to Figure I, pipe line 1 represents a supply line for one of the reactants being used and pipe line 2 represents a supply line for the other reactant. It will be understood that my process and apparatus may be used in carrying out reactions between more than two reactants but only two are necessary to illustrate the process. The feed to the system from pipe lines 1 and 2, together with unreacted material recovered from the product and returned to the system by pipe line 3 may be passed by line 4 through a heat exchanger 5. Instead of such heat exchanger it may be advantageous to use some other type of temperature controlling unit such as a heater or cooler supplied with a temperature regulating medium other than product containing material as shown. The products may be conducted by line 4 to a treating unit 19 in which undesirable components, if present, may be removed. Such a unit is particularly advantageous for removal of water, for example, from hydrocarbon feed where my invention is being applied to the alkylation of isoparaffins and the like with olefines in the presence of alkylation catalysts such as sulfuric acid and the like. In such cases the presence of water in the feed tends to reduce the effective life of the catalyst by dilution. By precooling the feed the water may be caused to separate out and may be withdrawn by valve controlled line 6. The purified feed may be conducted by line 7 to a mixer 8. Where the recovered unreacted material is substantially free from the component being separated in unit 19 it may be desirable to connect line 3 with line 7 instead of with line 4.

In mixer 8 the components of the feed may be thoroughly mixed by means of suitable agitating devices not shown or the mixing accomplished by turbulent flow of the reactants in the feed lines may be depended upon to secure the desired intimate contact under substantially non-reaction conditions. Product containing unreacted components may if desired be mixed with the feed, advantageously in mixer 8 to which such product may be introduced by line 9. The resulting mixture flows through pipe line 10 to circulating line 11 where it is mixed with previously reacted mixture containing catalyst if necessary. Line 11 connects with circulating means such as pump 12 from which the mixture passes in a closed circuit through line 13 to residence time increasing means such as time tank 14 back to line 11.

Means for withdrawing material from the circulating mixture, such as line 15 connecting with separator 16 are provided. Where mixtures made up of two liquid phases are obtained, separator 16 may be a stratifier from which the upper layer may be withdrawn by line 17 and lower layer removed by line 18. As illustrated, the upper layer is assumed to contain the desired product a part of which may be returned by line 9 to mix with the feed while the remainder is conducted by line 20, contingently through heat exchanger 5, to separating means 21 which may be a still or extractor or other suitable device for separating the desired product from unreacted material present therewith. The product may be withdrawn by line 22 and unreacted material returned, for example, by line 3 for mixing with the feed. Separating means 21 may be one or more units in which other components, such for example, as inert material and the like, may be separated in addition to the reaction product. The lower phase from separator 16 may be returned by line 23 to the closed circuit. It will be understood that where the desired product is present in the lower instead of the upper layer of separator 16 the connections of pipes 17 and 18 may be reversed. Lines 24 and 25 may be provided for withdrawing and replacing a component or components of the mixture such for example as the catalyst used.

In order to control the proportion of reacted mixture withdrawn from the circulating stream by line 15, means such, for example, as restriction orifice 26 and valve 40 may be provided. Where such a restriction orifice is used, advantage may be taken of its mixing effect and in such a case feed line 10 is preferably joined to line 11 just ahead of orifice 26. Additional mixing effect may advantageously be obtained by other suitable means for promoting intimate mixing established in the circuit such, for example, as mixing nozzles 27. The circulating means 12 may also provide desirable intimate mixing. Dispersing means are also preferably provided in the residence time increasing means 14. A particularly desirable form of dispersing means for use in time tanks is perforated plates 28 capable of maintaining the desired dispersion of reaction mixture throughout the residence time of the mixture in the tank, though other dispersing means may be used.

A temperature controlling unit 29 provided with fluid passage means may be used for regulating the reaction temperature. Figure I shows the temperature controlling unit in a branch of the circulation system from which a part of the circulating mixture is withdrawn by line 30 and returned by line 31. For regulating the proportion of reaction mixture flowing through the temperature controlling unit 29 a suitable device such as restriction orifice 32 may be provided. The temperature controlling device may be either a heater or cooler as required. Heat transfer therein may be either direct or indirect. For example, heating may be effected electrically or by means of combustion gases or by a heated fluid or the like. Cooling may be accomplished, for example, by circulating cooling fluid in indirect heat transfer relation with the reaction mixture or by evaporation of a part of the mixture or other suitable means.

Figure II illustrates an arrangement of my novel apparatus in which the temperature controlling unit 29 is in series communication with residence time increasing means 14. Line 13' completes the closed circuit. Cooling by means of butane is illustrated. The butane being circulated through unit 29 by means of pump 33, feed line 34, exit line 35, vaporizer 36 and return line 37. Lines 38 and 39 provide for passage of the vaporized butane to a compressor not shown and return of liquefied butane to the system respectively. It will be understood that not only may other cooling agents be used but also heating instead of cooling may be provided depending upon the nature of the reaction being carried out. Elements equivalent to those shown in Figure I have the same numerals.

Figure III shows an alternative method for connecting temperature controlling unit 29 in a branch of the closed circuit. In this case the reaction mixture flows downward through unit 29 and is preferably returned to the circuit at about the point of introduction of the feed. Where temperature control is by evaporation of a part of the reaction mixture in unit 29 a pressure reducing valve, not shown, is preferably provided in line 30 and a pump, not shown, may be used for returning unevaporated mixture to the circuit by line 31. Such a cooling method may also be used in the system illustrated in Figure II whether or not the evaporation is carried out at the same pressure as used for the reaction. In either case the vaporized material may be sent to a compressor, not shown, where it may be liquefied and then added to the feed to the system or injected directly into the mixture in unit 29 as by line 34. Under such circumstances line 35 may serve as an outlet for vapors and may be directly connected to line 38.

The following examples illustrate typical applications of the process and apparatus of my invention to the alkylation of isoparaffins with olefines.

Example I

A hydrocarbon mixture containing about 60% of olefines preponderantly of six carbon atoms per molecule was reacted with isobutane in an assemblage of apparatus similar to that shown in the drawings, and having a volume of about 400 gallons (exclusive of the separator). At the start of the run the system was half filled with sulfuric acid of about 99% concentration and isobutane in the liquid phase then run in until the reactor was full. The circulating pump was then started and after thorough emulsification of the isobutane and acid a mixture of the olefine with isobutane was introduced.

The olefine-containing hydrocarbon was fed to the system at a rate of 0.75 gal. per minute with isobutane feed at the rate of 1.0 gallon per minute. Isobutane recovered from the reaction product was recycled at a rate equivalent to 6.0 gallons of isobutane per minute giving a ratio of approximately 10 mols of isobutane per mol of olefine in the feed. Reacted mixture of hydrocarbon and acid was recycled at a rate giving an effective ratio of isobutane to olefine of about 100 to 1.

In a 24 hour period in which a reaction temperature of about 15 to 18° C. was maintained, a weight percent yield, based on olefine-containing hydrocarbon feed, of 152% was obtained. The concentration of acid withdrawn from the system was 94.5%. By this type of treatment it was found that from a cracked gasoline having an A. S. T. M. octane number of 77.2 products of the following properties may be obtained:

|  | Bromine number | A. S. T. M. octane No. |
| --- | --- | --- |
| Total product | 0.86 | 81.2 |
| 0° to 210° F. cut | 0.89 | 77.9 |
| 210° to 300° F. cut | 0.15 | 88.5 |
| 0° to 300° F. cut |  | 83.4 |

Example II

In the same apparatus as used in Example I, the polymers obtained by interpolymerization of isobutylene with normal butylenes in the presence of hot sulfuric acid were used to alkylate isobutane. After starting up as before, the polymer was fed in at the rate of 0.6 gallon per minute together with 1.3 gallons of fresh isobutane, and 5.3 gallons of isobutane recovered from the reaction products making a total hydrocarbon feed of 7.2 gallons per minute containing a ratio of isobutane to unsaturates of about 11 to 1. Reacted mixture was recycled at a rate giving an effective ratio of isobutane to olefines of about 65. The concentration of the withdrawn acid was 94.5%, having been reduced from 98% during the reaction. In a typical period during which the reaction temperature was maintained at 15 to 18° C., 1675 gallons of alkylated product were recovered. After correcting for the alkylation due to olefine in the isobutane supplied, it was found that a yield of about 200% by volume based on the polymer feed had been obtained. A sample of the product showed 76% boiling between 23° and 130° C. and having an octane number of 92.6 and a bromine number of 0.1.

Example III

In plant scale operation of my apparatus for interpolymerization of isobutylene with normal butylene by reacting a butane-butylene fraction with sulfuric acid an additional time tank in series with that shown on the drawings was used. With hydrocarbon feed containing an average of 28.8% of normal butylenes and 18.8% of isobutylene and using sulfuric acid of about 71% initial concentration a yield of polymer of 176% based on the isobutylene input was obtained while consuming only 1.95 pounds of acid (equivalent of 100% $H_2SO_4$) per barrel of hydrocarbon reacted or 0.172 pound of acid per gallon of polymer produced, by using a ration of recycled reacted mixture such that about 8.5 mols of normal butylenes are present at the point of feed inlet per mol of isobutylene. Reducing the proportion of reacted mixture recycled to the equivalent of a 6.5 ratio of normal to isobutylene reduced the yield to 163% total polymer while increasing it to give a ratio of about 11 increased the yield to about 192%.

These results demonstrate the advantages of the apparatus and method of my invention. For example, in my novel reactor there is also less power required for maintaining reactants in a thoroughly dispersed condition. This is preferably achieved by using a pump for circulating the recycle stream which does not have to act simultaneously as a mixing device. The power required for producing and maintaining the dispersion may then be imparted by the pump to the recycle stream and converted into dispersion effect at the feed mixing nozzles and perforated plates in the time tank. It will thus be seen that my apparatus provides for maximum mechanical efficiency as well as high chemical and thermal efficiencies.

While the invention has been described in a detailed manner in connection with specific examples, it will be understood that the same principles may be applied with advantage to other reactions and that my invention is capable of wide variation not only with respect to materials which may be reacted but also in regard to the conditions of operation employed. For example, instead of using an immiscible liquid catalytic agent for promoting the desired reaction suitable suspended solid catalytic agents may be used. Instead of the single time tank shown in the drawings a plurality of residence time increasing means of the same or different types may be used. Furthermore, such units may be connected in series or in parallel. Also, instead of the single circulating stream of reaction mixture shown a plurality of such circulating streams may advantageously be employed. For example, pipe line 22 may connect with the feed line 1 of a similar system in which further reaction is carried out with the same or another suitable reactant. In such operation countercurrent contact with catalyst or the like may be achieved by connecting line 24 of the second reactor assemblage with line 25 of the initial reaction system. Alternatively the two systems may be connected through their respective lines 24 and 25 only. It is also feasible to eliminate separator 16 from one of the systems and to connect them by line 15 feeding either to a line such as 1 or 25. It may in certain cases be desirable to provide cooling or other suitable means in pre-mixer 3 in order to discourage undesirable premature reaction. Where the invention is used for the reaction of hydrocarbon with acid, for example, it is not essential usually to have complete separation of hydrocarbon from acid before return of the latter to the recycled stream by line 23 but it may be desirable that as much of the acid as possible be separated from the reaction product withdrawn from the separator by line 17. Still other modifications may be made, consequently no limitations other than those imposed by the appended claims are intended.

I claim as my invention:

1. A method of conducting an organic chemical reaction between at least two reactants at least one of which is an organic compound in the liquid phase which comprises circulating a reaction mixture containing said organic compound of large total mass relative to the feed and of substantially uniform composition in a closed circuit while regulating the temperature of at least a portion of said flowing stream beyond the point of introduction of the feed to a temperature favorable to said reaction, withdrawing a part of the circulating mixture of substantially the same composition as said circulating mixture, removing reaction product therefrom, returning unreacted organic material separated from said recovered product to said circuit and introducing a plurality of reactants into the circuit to replace those withdrawn from the system whereby there is established in said circuit a ratio of reactants different from that in the feed.

2. A method of conducting an organic chemical reaction between an organic compound which tends under the conditions of said reaction to undergo undesirable side reaction and a less reactive organic compound, which comprises feeding a mixture of said reactants in the liquid phase to a substantially larger mass of a continuously circulating stream of reaction mixture of substantially uniform composition maintained at a temperature favorable for said reaction, continuously withdrawing a part of the reacted mixture of substantially the same composition as said circulating mixture at a point in the circuit sufficiently removed from the point of introduction of said reactants that substantial reaction of the organic compound which tends to undergo undesirable side reaction under the reaction conditions takes place therebetween, recovering reaction product from the withdrawn mixture and contacting a sufficient amount of non-withdrawn reaction mixture with the feed to insure the presence of a higher proportion of said less reactive organic compound in the mixture than in the feed and to promote reaction between said organic compounds and to suppress said undesired side reaction.

3. A method of conducting an organic chemical reaction between an organic compound which tends under the conditions of said reaction to polymerize readily and another organic compound which is less readily polymerized under said conditions which comprises feeding a mixture of said organic compounds containing a stoichiometric excess of said less readily polymerizable compound to a substantially larger total mass of a continuously circulating stream of reaction mixture of substantially uniform composition maintained at a temperature favorable for said reaction, continuously withdrawing a part of the reacted mixture of substantially the same composition as said circulating mixture at a point in the circuit sufficiently removed from the point of introduction of said reactants that substantial reaction of said organic compounds takes place therebetween, recovering reaction product from the withdrawn mixture and contacting a sufficient amount of non-withdrawn reaction mixture with the feed to insure the presence of a higher proportion of said less readily polymerizable organic compound in the reaction mixture than in the feed and to promote reaction between said organic compounds and to reduce undesirable polymerization of said more readily polymerizable organic compound.

4. A method of conducting an organic chemical reaction between an organic compound which tends under the conditions of said reaction to polymerize and an organic compound which does not polymerize under said conditions in the presence of a liquid catalyst for said reaction which catalyst is substantially immiscible with and of greater density than said non-polymerizing organic compound and the product of said reaction which comprises feeding said organic compounds in proportions corresponding to a stoichiometric excess of the non-polymerizing organic compound to a substantially larger mass of a continuously circulating stream of reaction mixture of substantially uniform composition maintained at a temperature favorable for said reaction and having said catalyst substantially uniformly dispersed therewith, continuously diverting a portion of said stream while contacting the non-diverted portion thereof with the feed whereby a higher proportion of said non-polymerizing organic compound is maintained in the reaction zone than in the feed and undesirable polymerization of said polymerizable organic compound is suppressed, separating from the diverted portion of said stream a catalyst phase and a reaction product-containing phase and returning at least a part of the diverted catalyst to the circulating stream.

FREDERIC M. PYZEL.